NEGATIVE-WORKING DIAZOSULFONATE REPRODUCTION PROCESS

Filed June 16, 1965 4 Sheets-Sheet 1

NEGATIVE-WORKING, SELF-DEVELOPING AND
DRY-PROCESSING (LIGHT CLEARED)
DIAZOSULFONATE PHOTO-REPRODUCTION

INVENTORS
DAVID P. HABIB
ROBERT S. ALLARD
EUGENE J. ZABIK

BY Abraham A. Saffitz
ATTORNEY

NEGATIVE-WORKING DIAZOSULFONATE REPRODUCTION PROCESS

Filed June 16, 1965 4 Sheets-Sheet 2

INVENTORS
DAVID P. HABIB
ROBERT S. ALLARD
EUGENE JOHN ZABIK

BY Abraham A. Saffitz
ATTORNEY

NEGATIVE-WORKING DIAZOSULFONATE REPRODUCTION PROCESS

Filed June 16, 1965 4 Sheets-Sheet 3

INVENTORS
DAVID P. HABIB
ROBERT S. ALLARD
EUGENE JOHN ZABIK
BY Abraham A. Saffitz
ATTORNEY

United States Patent Office 3,479,183
Patented Nov. 18, 1969

3,479,183
NEGATIVE-WORKING DIAZOSULFONATE REPRODUCTION PROCESS

David P. Habib, West Springfield, Robert S. Allard, Chicopee Falls, and Eugene J. Zabik, South Hadley Falls, Mass., assignors to Tecnifax Corporation, Holyoke, Mass., a corporation Filed June 16, 1965, Ser. No. 464,447
Int. Cl. G03c *1/58, 5/34*
U.S. Cl. 96—49 27 Claims

ABSTRACT OF THE DISCLOSURE

Negative-working self-developing diazo photoreproduction process and product employing a para-amino benzene diazosulfonate and coupler in the presence of a non-volatile amine alkaline agent creating pH environment of between 6.2 and 11.5 for exposure under imagewise actinic illumination to convert the diazosulfonate into a diazonium compound which, in the form of a print-out azo dye-coupled image, is thereafter acidified to a pH below 4.7 and light-cleared by exposure to overall actinic illumination to clear away the background and produce colorless products of decomposition outside of the azo dye image areas.

The present invention relates to a novel negative-working process for producing a high-resolution, high-acuity and high density azo dye image from a mixture of a pure diazosulfonate and a coupler which is applied as a coating to produce a thickness of from 3 to 30 microns at the surface of a base support, preferably a transparent or translucent base.

The invention also relates to novel dry-processing, negative-working products embodying a pure diazosulfonate, a coupler and a non-volatile amine, the amine providing a substantially odorless alkaline agent producing an environment of low toxicity and of pH about 6.2–11.5 to achieve maximum density and highest efficiency of image formation as a result of imagewise exposure.

In a preferred form, the product of the present invention provides a negative-working, dry processing and light-clearing photo-reproduction system embodying pure diazosulfonate and coupler in film form wherein all stages of the process are carried out within the confines of a very thin, well-defined layer, preferably a thermoplastic layer such as cellulose acetate, cellulose acetate butyrate or ethyl cellulose, or a layer derived from the thermoplastic, for example a regenerated cellulose or hydrolyzed cellulose acetate.

Figure 1:
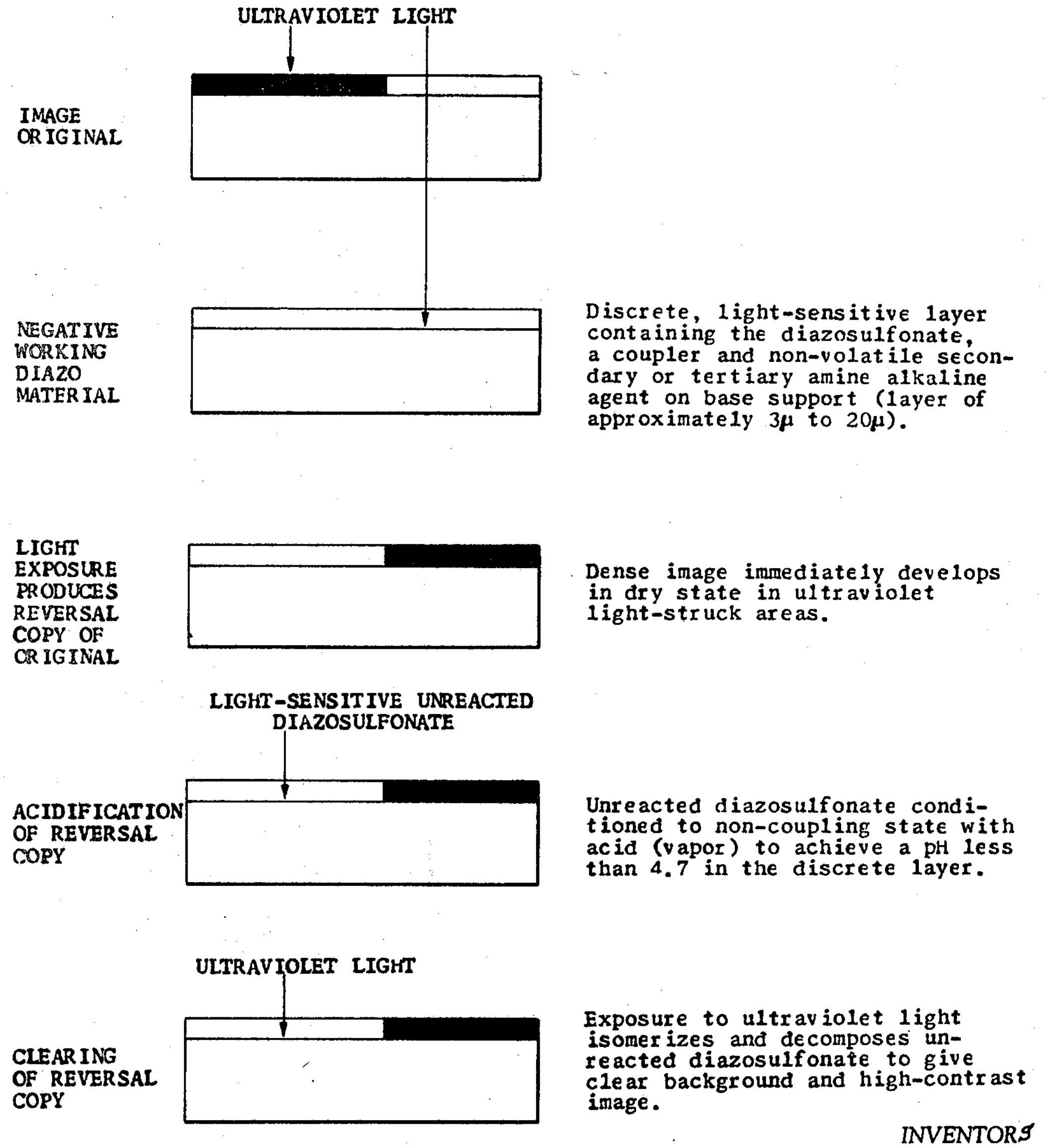

The diazosulfonate photo-reproduction system of the present invention is illustrated diagrammatically in FIG. 1, which summarizes the essential steps of:

(a) Exposure for self-development which achieves a negative reproduction at alkaline condition, above pH 5 and below pH 12, while confining the dense dye image in the surface layer of the support;

(b) Treatment of the negative image-bearing material with dry acid vapor to produce a strongly acid environment, substantially less than pH 4.7 in the light-sensitive layer, thereby conditioning the negative image-bearing material for light clearing;

(c) Light-clearing the acid conditioned negative image-bearing material by exposing it to overall actinic, ultraviolet illumination, thereby decomposing the unreacted, acidified diazosulfonate and forming clear colorless products of decomposition to produce a stable, fixed negative dye image of high density wide tonal scale against a clear light background.

The closest prior art relating to the present invention is the procedure taught in Van der Grinten, U.S. Patent No. 1,926,322, the teaching in the examples disclosing applying a mixture of sodium bisulfite and p-diazodiphenylamine in a water medium to a bibulous paper base. The Van der Grinten paper material comprises some amount of impure diazosulfonate which is formed in situ, is spread over the surface and more or less impregnated into the thickness of the paper stock. The light sensitive material imbibed in the paper is of a yellowish cast and contains substantially proportions of alkali bisulfite and of decomposition products resulting from the reaction of the diazo compound with the bisulfite. After exposing this light-sensitive material to actinic illumination and fixing with either hydrochloric acid vapors or with aqueous hydrochloric acid, there results a very weak yellow-to-brown image in the exposed areas which can barely be distinguished from the yellow color in the non-exposed areas. The image quality is so poor that only massive light and dark areas can be distinguished. The tonal scale is so inadequate that the reproduction system is completely unsatisfactory for commercial operations.

The present process distinguishes from the negative-working process of Van der Grinten in U.S. Patent No. 1,926,322 by confining the light-sensitive pure diazosulfonate to a very thin surface layer of the support; e.g. within a thickness of about 3–30 microns, and by eliminating all impurities such as would interfere with the production of high-acuity, high-resolution, high density images throughout the entire range of colors achieved by appropriately combining diazosulfonate and coupler. The elimination of sodium carbonate impurity and, indeed, the elimination of inorganic impurity generally, is achieved by incorporating as an essential component of the sensitizing composition, an organic alkaline agent for regulating the desired dye forming rate in the dry state.

Thus, a third distinction of the present novel self-developing, dry-processing material over the light-sensitive material of Van der Grinten is based upon the image sharpness and high contrast of self-development achieved in the invention as a result of incorporating small amounts of a non-volatile amine which conditions the diazosulfonate and coupler to maximum density and produces the highest efficiency of utilization of light-sensitive materials in an inorganic, salt-free environment. Amines are widely employed as alkaline agents, but the most available aliphatic amines, such as dimethylamine, triethylamine, monoethanolamine or triethanolamine, are all unsatisfactory because of their highly offensive odor, their toxicity and their lack of persistence. It is unexpected to find that the limited class of solid, nonvolatile amines used in the present invention can be so highly effective as alkaline regulating agents for maximum density of self-development during the light exposure step, yet permit vapor acidification and light clearing to produce colorless or light colored products and completely stabilized images.

The present process is a species of diazo-reversal diazotype as defined in Paper No. 22, "Symposium on Unconventional Photographic Systems," SPSE, Oct. 29–31, 1964, Washington, D.C., entitled, "The Diazotype Process" by D. P. Habib et al. This paper contrasts the conventional diazotype process with the diazo-reversal process as follows:

DIAZOTYPE PROCESS

A positive-working process which utilizes diazonium salts to produce azo dye images.

DIAZO-REVERSAL PROCESS

A negative-working process which utilizes diazo compounds to produce azo dye images, e.g. diazosulfonates and diazo-oxides.

The basic operating differences between the diazo-sulfonate and diazo-oxide (quinone diazide) reversal processes are as follow, reference being made to "Decomposition of o-Hydroxy-Diazonium Compounds of Light," J.

DeJonge and R. Dijkstra, Recueil, 67, (1948) pp. 328–342:

(1) The irradiation product of o-hydroxy benzene diazonium compounds is a cyclopentadiene carboxylic acid while the irradiation product of benzene diazosulfonate is the same as the diazo compound itself. As a result of the light decomposition, the practical and significant difference between the negative diazosulfonate process and the diazo-oxide reversal process is the fact that a wide variety of azo dye colors may be produced from diazosulfonate coupler combinations whereas *only one* azo dye may be produced from each diazo-oxide. The cyclopentadienecarboxylic acid decomposition product couples much more rapidly than phenolic, naphthol or pyrazalone couplers (see page 335, paragraph 2 of the aforementioned article).

(2) The cyclopentadiene carboxylic acid formed as a result of decomposition under actinic light is a very active coupling component and forms red azo dyes with the diazonium compound.

(3) The fixing or prevention of image formation in the unexposed portions of diazo-oxide coated support requires that there be complete elimination of moisture or adjustment of the coated support to extremely high acid levels. This requirement need not be met with the diazosulfonates of the present invention.

Exposure to actinic light converts the "inactive" diazosulfonate (A) to the "active" diazonium salt (B). Because the diazonium form is decomposed by actinic light, the two light-induced reactions can proceed simultaneously.

$$\underset{(A)}{ArN_2.SO_3Na} \xrightarrow[\text{isomerization}]{hv} \underset{(B)}{Ar\overset{+}{N}_2\overset{-}{O}SO_2Na} \xrightarrow[\text{decomposition}]{hv} \underset{(C)}{ArOSO_2Na + Z_2}$$

Light isomerization and the transition from (A) to (B) is the negative-working reaction. Light decomposition and the transition from (B) to (C) is the positive-working reaction. Once isomerization begins, both positive-working and negative-working reactions can proceed simultaneously. The relative rate of decomposition to isomerization will determine the image density and will further determine whether a positive or negative image is obtained. A relatively low decomposition rate will create the necessary conditions to give a high diazonium compound concentration which compound is capable with dye coupler of producing an azo dye of high image density. Conversely, a relatively high decomposition rate will produce a low diazonium compound concentration and this will produce a low image density in the presence of dye coupler.

There is an essential dynamic factor in the above-described relation which brings about alteration of interdependent reaction rates when a dye coupler is present in the system; namely, the ratio of the coupling rate to the diazonium decomposition rate.

$$ArN_2.SO_3Na \xrightarrow[\text{isomerization}]{hv} Ar\overset{+}{N}_2\overset{-}{O}SO_2Na \xrightarrow[\text{decomposition}]{hv} Ar.OSO_2Na{+}_2$$

$$\downarrow \text{coupling}$$

$$\text{Azo dye}$$

From the above, it is seen that the decomposition rate and the coupling reaction rate are in competition with each other, and either could override the other.

If the decomposition rate greatly exceeds the coupling rates, there is very little diazonium salt available to couple to form the dye image, and a weak image results. Moreover, if in this case the isomerization reaction rate is very rapid, the system then becomes positive-working, and a weak positive image results, which concept is the basis of another patent application to follow. Conversely, if the coupling rate greatly exceeds the decomposition rate, then the process is negative-working and a dense negative image results.

The foregoing is believed to explain the poor performance hitherto observed of derivatives of p-aminobenzene diazosulfonate under acid conditions (pH less than 7). Because this family of diazo compounds has a relatively high light decomposition rate, very low density images are invariably obtained under normal processing conditions. However, when pre-adjusted or pretreated before exposure with non-volatile alkaline amine, the coupling activity in accordance with the invention is made to greatly exceed the light decomposition rate and thus a high image density is obtained upon exposure to light.

o-Sulfobenzaldehyde sodium salt, because of its known bisulfite addition characteristics, is added to the negative-working formula to increase the diazosulfonate isomerization rate by reacting with the sulfonate. The net effect of o-sulfobenzaldehyde is to increase image density and to improve light-clearing. Various additives to perform a wide variety of functions including alteration of hue, increasing density, improving shelf-life and the like may be used in the formulation.

Figure 2:
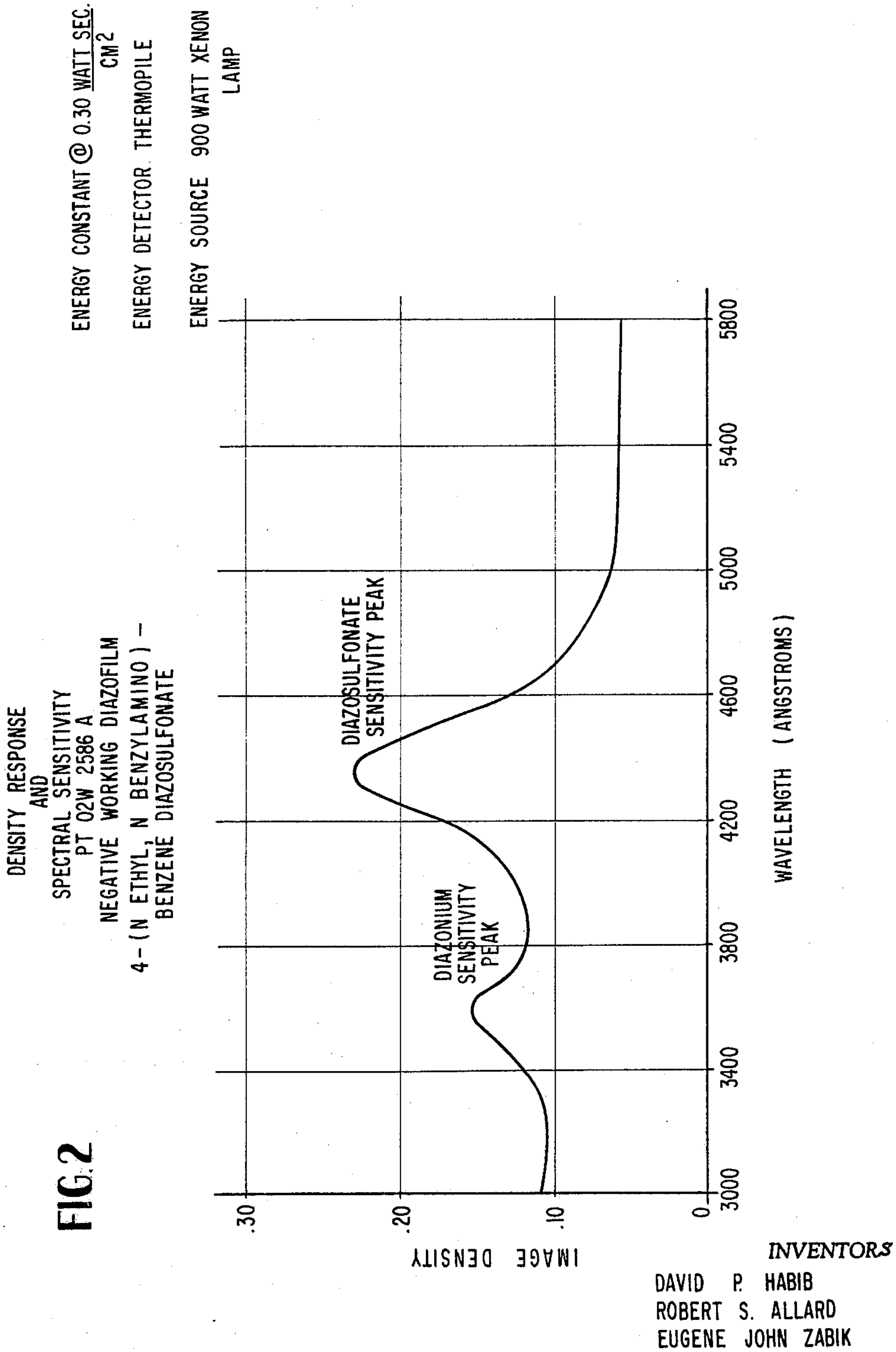

As shown in FIG. 2 of the drawings herein, a preferred embodiment of the novel, negative-working material of the invention which uses 4-(N-ethyl, N-benzylamino) benzene diazosulfonate as its light-sensitive component, shows peak sensitivities at 3600 A. and 4350 A. (see graph of FIG. 2) for the active diazonium compound and the diazosulfonate, respectively, in the sensitive range between about 3000 A. and 5800 A. shown in the graph.

The diazonium chloride, zinc chloride double salt counter-part of the above compound has an absorption peak around 3800 A., while diazosulfonate has an absorption peak at 4350 A.

The 4350 A. sensitvity peak is that of the diazosulfonate which isomerizes to the active form and the 3600 A. peak is that of the diazonium compound which breaks down under exposure to image producing illumination (ultraviolet).

The best efficiency and the highest density in the present negative-working system is obtained if the primary exposure is restricted, insofar as possible, to intense monochromatic radiation of 4350 A. wave length to which the preferred illustrated diazosulfonate is most sensitive. The most efficient light-clearing is, in turn obtained by exposing the acidified print to strong radiation at 4350 A. and 3600 A. either simultaneously, which radiation, for example, may emanate from a single source, or successively to strong radiation from these two selected wave lengths from two different sources to isomerize and decompose the light-sensitive compound so as to leave a clear background. Accordingly, it can be seen that the light-clearing step can be done by an overall illumination of the diazosulfonate material between the wavelengths of 3400 A. to 4600 A., i.e., the range and sensitivity of the diazosulfonate compound and the corresponding diazonium compound.

This exposure to monochromatic radiation at the major sensitivity wave length of the diazosulfonate may be compared to the production of a latent image in silver halide photographic systems.

This latent image concept results in even greater advances in the state of the diazo-reversal art and permits a unique use of monochromatic radiation in processing negative-working materials.

In view of the foregoing advantages of the present invention over the prior art reversal processes, it is an object of the invention to provide a high-acuity, high-resolution, high density scale, dry-processing, negative-working process capable of producing a wide range of colors.

It is a further object of the invention to provide a negative-working, dry-process which forms a latent image by exposing the diazonsulfonate to intense monochromatic radiation in the about 4200 to 4600 A. region. This latent image could then be stored more or less indefinitely and developed only as desired by simply exposing to ammonia vapors as in the conventional positive-working systems. The resulting print could then be acidified and light-cleared as desired, according to the novel process of the present invention. The specific exemplification of the latent image concept has been established with 4-(N-ethyl, N-benzylamino) benzene diazosulfonate which is most sensitive to radiation in the range of 4200 to 4600 A., but its corresponding diazonium is most sensitive to radiation of 3400 to 3800 A.

A further advantage of the invention is its adaptability in carrying out the negative-working concept to achieve new and improved three-color processing operations; and reference is made to Fago U.S. Patent No. 3,103,436 to illustrate the practical advantages of the diazo system for three-color separation negative production in the achievement of three-color prints. A direct comparison is had from FIG. 3 of the drawing herewith which incorporates the three-color process of the present invention and illustrates the new concept and new uses of the latent image.

Figure 3:
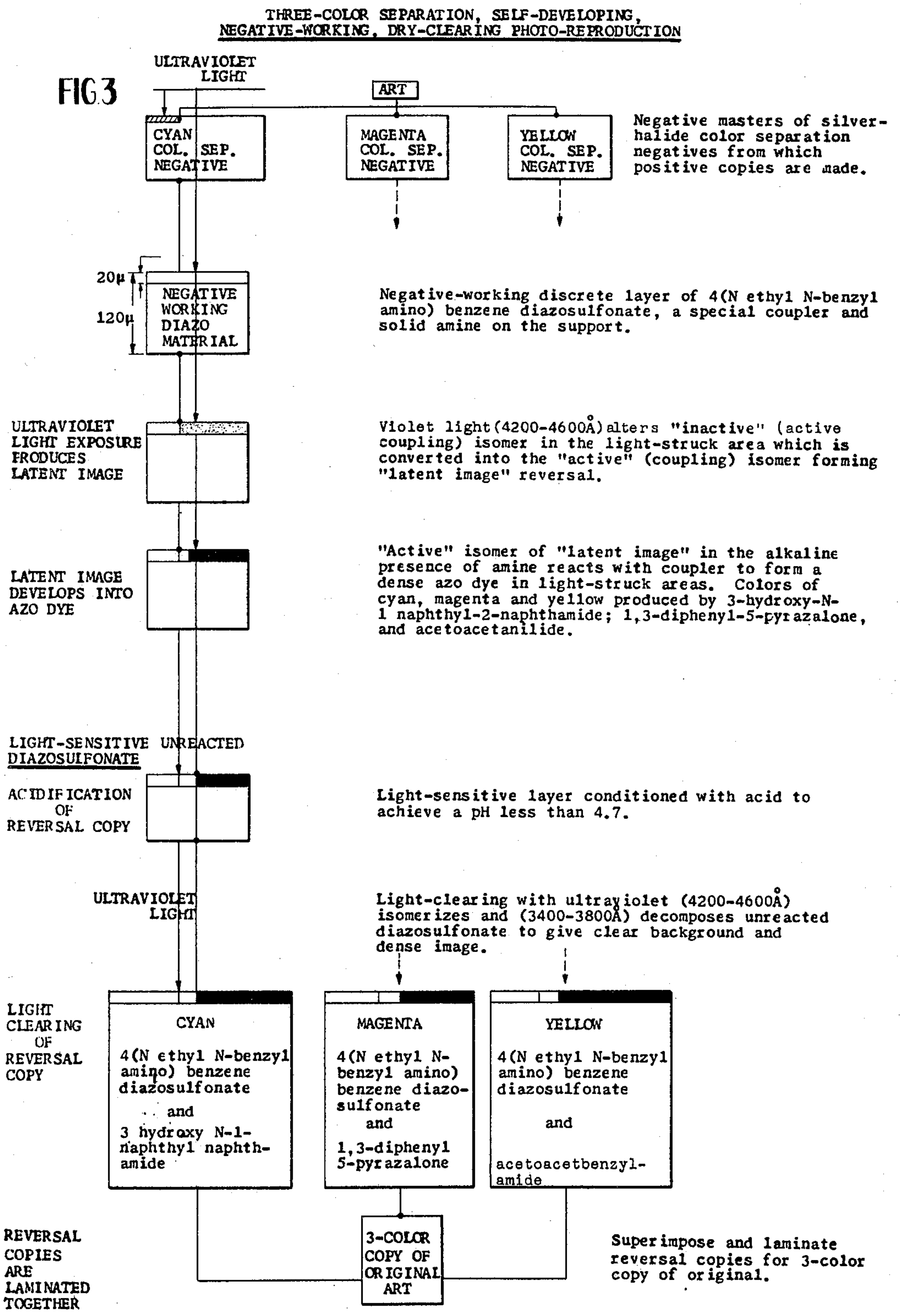

As shown in FIG. 3, a cyan, magenta and yellow color separation negative is made directly from the respective silver halide color separation masters by the simple steps of exposing, acidification and light-clearing, all carried out in the dry state, and utilizing a single diazosulfonate, 4-(N-ethyl N-benzylamino) benzene diazosulfonate. The coupler for the cyan negative is 3-hydroxy N-1-naphthyl naphthamide. The coupler for the magenta negative is 1,3-diphenyl 5-pyrazalone. The coupler for the yellow negative is acetoacetbenzylamide.

In comparison with the cumbersome and complicated steps set forth in Fago color separation method, the present invention cuts the number of steps to less than half, e.g. to three steps which are as follows:

(1) Make photographic color separation negatives.

(2) Print the separation negatives onto the corresponding cyan, magenta and yellow diazosulfonate negative-working materials.

(3) Combine the three diazo prints for a finished three-color print.

In the example of FIG. 3, the coupler components were selected in just one embodiment for purposes of illustration. An important advantage of the invention in achieving diazo-reversal superior to that of the diazo-oxide process lies in the control of the coupling rate which is of obvious practical value in realizing the full potential of the system. Listed below in Table I are typical classes of rate-controlling couplers, A being among the slowest, E being among the fastest and B, C, D ranging in order from slow to fast.

TABLE I

Coupler classes for N-tone patent

A. Hydrogen-bonded resorcinols

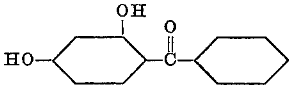

4-benzoyl resorcinol

B. m-Hydroxyphenyl compounds

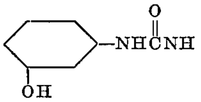

m-hydroxyphenylurea

C. Resorcinols

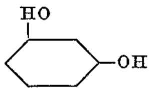

Resorcinol

D. Acetoacets

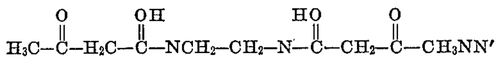

ethylene bis acetoacetamide

E. Pyrazolones

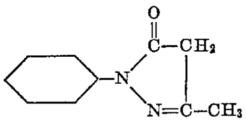

1-phenyl-3-methyl pyrazolone

Other couplers which may be used include:

Beta oxynaphthoic acid o-aniside
Phloroglucinol
Phloroglucide formate ester
Phloroglucide acetate ester
Resorcinol
Polyresorcinol (see U.S. Patent No. 3,086,861)
Polyresorcinol pyrazalone
2-hydroxy-5-methyl thiophene-4-carboxylic acid
Methyl-2,4,6-trihydroxy benzoate
1,8-dihydroxy naphthalene-3-sulfonic acid
1,8-dihydroxy naphthalene-4-sulfonic acid
1-hydroxy-8-benzoylamino-naphthalene-3-sulfonic acid
1-hydroxy-8-phenylamino-naphthalene-4-sulfonic acid
1-hydroxy-8-methylamino-naphthalene-5-sulfonic acid
2,8-dihydroxy-naphthalene-6-sulfonic acid There follows a listing of preferred diazosulfonates which produce high density images.

| RS No. | P-phenylene diamine diazosulfonate | Melting point, ° C (with decomposition) |
|---|---|---|
| 24 | 4-N(2,6-dimethylmorpholino benzene diazosulfonate sodium salt. | 199–200 |
| 58 | 4(N-ethyl, N-benzylamino) benzene diazosulfonate sodium salt. | 211 |
| 62 | 4(N,N-diethylamino)-3-chlorobenzene diazosulfonate sodium salt. | 200–202 |
| 78 | 4-N pyrrolidino-3 chlorobenzene diazosulfonate sodium salt. | 240–250 |
| 111 | 4(N-ethyl, N-benzylamino) benzene diazo-N-morpholino methyl sulfonate. | 220 |
| | 4-N pyrrolidino-3-chlorobenzene diazo-N-morpholino benzyl sulfonate. | ----------- |

Other readily available examples of workable diazosulfonates are given as follows, also with the identifying number and the melting points:

| RS No. | P-phenylene diamine diazosulfonate | Melting point, ° C. (with decomposition) |
|---|---|---|
| 0 | Diphenylamino-4,4'-tetrazosulfonate disodium salt. | 280 |
| 48 | 4-phenylamino-3-methoxy benzene diazosulfonate sodium salt. | 200–203 |
| 54 | 2-pyrrolidino-5-pyridine diazosulfonate sodium salt. | 260–280 |
| 63 | 4(N-methyl, N-beta-hydroxethyl) benzene diazosulfonate sodium salt. | 165 |
| 67 | 4-phenylamino-2-methoxy benzene diazosulfonate sodium salt. | 125–200 |
| 68 | 4-N-biguanidino-2, 5-dimethoxy benzene diazosulfonate sodium salt. | 190–230 |
| 72 | 4-(N,N-diethylamino)-2-methyl benzene diazosulfonate sodium salt. | 230 |
| 73 | 4-(N-morpholine)2-methoxy benzene diazosulfonate sodium salt. | 250 |
| 83 | 4-N-pyridino-3-chloro benzene diazosulfonate sodium salt. | 223 |
| 88 | 4-N-morpholino-3-chlorobenzene diazosulfonate sodium salt. | 190 |
| 89 | 4-N-pyrrolidino-3,5-dichlorobenzene diazosulfonate sodium salt. | 220 |
| 101 | 4-N-ethylamino-3-methylbenzene diazosulfonate sodium salt. | 250 |
| 103 | 4-N-pyrrolidino-3-chlorobenzene diazosulfonate potassium salt. | 220–235 |
| 105 | 4-N-pyrrolidino-3-chlorobenzene diazo-(N,N-di-beta-hydroxyethyl aminoethyl sulfonate. | 230–240 |
| 106 | 4-N-pyrrolidino-3-chlorobenzene diazo-(N-morpholinomethyl) sulfonte. | 250 |
| 107 | 4-N-pyrrolidino-benzene diazo hydroxymethyl sulfonate. | ----------- |
| 108 | 4-(N-ethyl, N-benzylamino)-benzene diazosulfonate potassium salt. | 237 |
| 110 | 4-(N,-ethyl,-N,-benzylamino) benzene diazo (N,N-di-beta-hydroxyethyl amino methyl) sulfonate. | 200 |
| 113 | 4-N-pyrrolidino-3-chlorobenzene diazo-[(N,N-di-β-hydroxyethyl) aminobenzyl] sulfonate. | 150–195 |
| 114 | 4-(N-ethyl, N-benzylamino)-benzene diazo-(N,N-di-β-hydroxyethyl) aminobenzyl sulfonate. | 215 |
| 115 | 4-N-pyrrolidino-benzene diazo-N-morpholino benzyl sulfonate. | 250 |
| 116 | 4-(N-ethyl, N-benzylamino) benzene diazo, N-morpholino benzyl sulfonate. | 222 |
| 117 | 4-N-pyrrolidino, 3-methoxy benzene diazo piperadino benzyl sulfonate. | 250 |
| 120 | 4-N-pyrrolidino, 3-methoxy benzene-N, N-diethyl aminomethyl sulfonate. | 192 |

It is noted from the foregoing listing that the radicals which are attached to the p-amino benzene diazosulfonates may be heterocyclic radicals, carbocyclic radicals, aliphatic radicals and aromatic radicals. The chain and cyclic structures include alkyl, alkenyl, aryl, aralkyl, alkaryl, hydrocarbon radicals, alkoxyl radicals and N, S or P heterocyclic radicals having aromatic properties.

Figure 4:
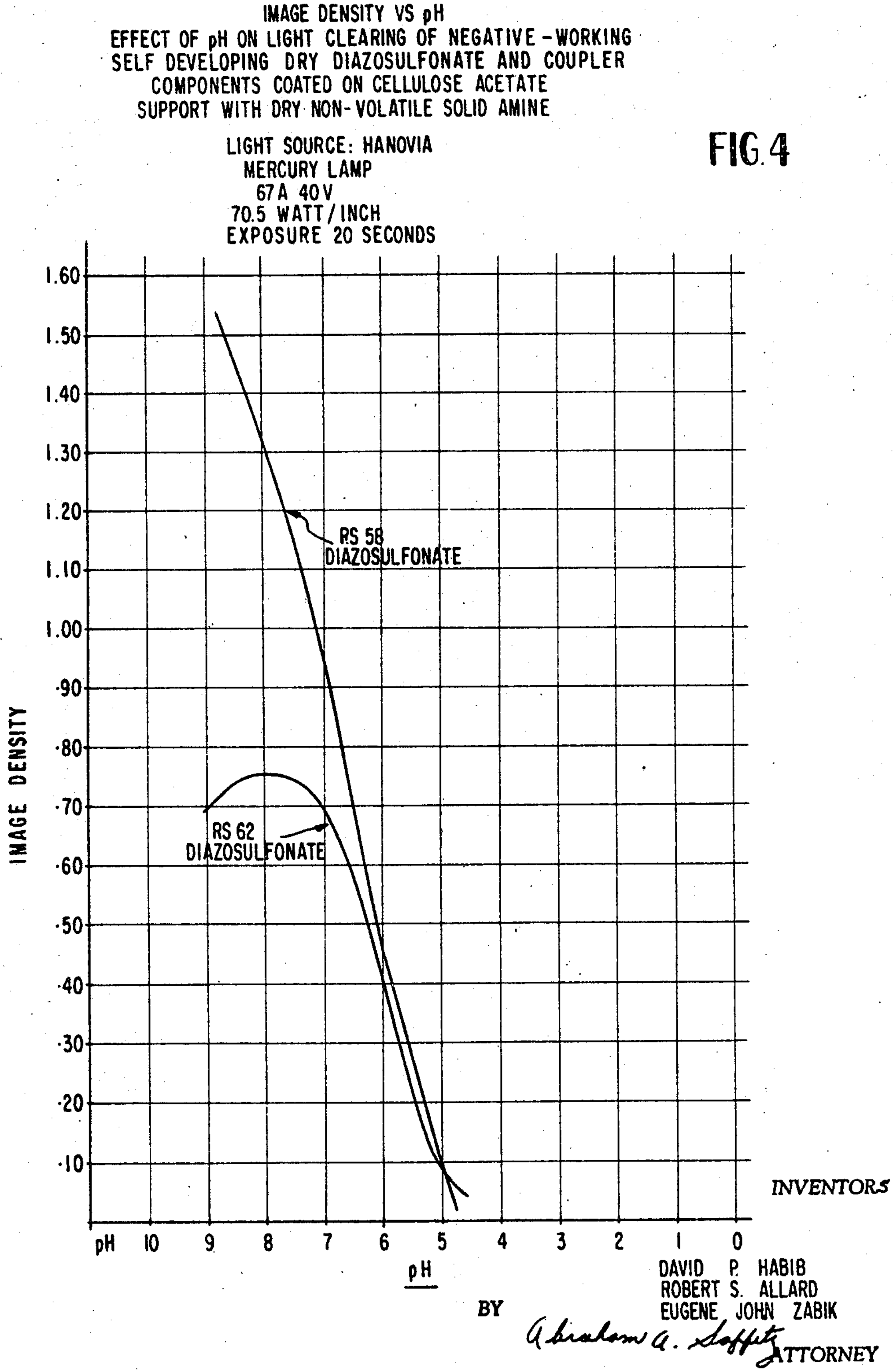

The foregoing p-aminobenzene diazosulfonate components of the invention are uniformly desirable in having a high rate of coupling activity for the coupler in a pH range of 5–12 and in being resistant to acid at a pH below 4.7, preferably at a pH of about 1–3, without suffering any chemical change, thereby adapting the diazosulfonate to acid conditioning and light clearing as exemplified in the curves shown in FIG. 4 herein. These diazosulfonates of the invention, and as shown in FIG. 4, decompose by the action of light to colorless or light colored products. This light decomposition is the basis of the clearing step which is carried out after acid conditioning by exposure to actinic radiation after the coupling step, the light-clearing being carried out at a pH of below 4.7 and generally at a pH of about 2–3 (see FIG. 4).

Other structures and their use, such as in the Sus diazo materials in U.S. Patent No. 2,217,189, are diazosulfonates of high light reactivity and relatively low coupling energy. These diazosulfonates are in an acidic system and are not self-developing. Development is achieved by the application of heat. Their properties and the manner of their use make them suitable only for positive-working systems. The Sus diazosulfonate type represents the kind of unsatisfactory material which cannot be used in negative-working systems.

Other diazosulfonate structures, such as in the von Poser material in U.S. Patent No. 2,197,456, are not workable because they possess high coupling activity at low pH values and therefore, cannot be light-cleared. Although they produce dense images, any attempt to adjust pH and light-clear, results in the production of very large background discoloration. This reactivity makes these structures wholly inoperative in our invention. Moreover, the von Poser materials are limited to the benzene alkoxy-substituted and halogen-substituted diazosulfonates. They require a water-wash for fixing and produce only a limited range of color.

The prior art is replete with examples of failures in the negative proofs in contrast with success in the positive process for the advantages of rapid coupling. Although the use of the diazotype process has grown to the point where over 100 firms now manufacture diazotype products throughout the world, none of these firms manufacture a diazosulfonate material or a negative diazo material which is capable of a wide variety of colors including black and can be used in a light background. Only the present aminobenzene diazosulfonates appear to be especially useful for the wide color possibilities in contrast to the diazo-oxides. The diazosulfonate material of the invention has a color range which is based on the amine structure.

The environment in which the clear area is so dark in the negative process so that the image cannot be distinguished is basically the type of failure encountered. It is therefore surprising that the chemically resistant diazosulfonates of the present invention can be so successfully empoyed by the dry process where more reactive materials have been found unsatisfactory.

The present process distinguishes over the dry positive, two component diazotype in respect to the two sets of conditions observed; the first, alkaline for self-development and the second, acid for light-clearing. In contrast to the conventional azo-dye coupling reaction in the dry process which occurs at a pH of about 7, the present diasosulfonate development is achieved in situ at a pH significantly higher than pH 7 by use of a low volatile amine and light-clearing. As in the dry positive process, the choice of both the diazo component and color-former, or coupler, determines the color that will be obtained.

The light-decomposition rate of the diazosulfonate ($ArN_2OSO_2Na$) shall be no greater than two times the coupling rate so that the image density will not be too weak. The best densities are achieved when the couping rate substantially exceeds the decomposition rate. Because the alkalinity or pH is a critical factor in determining the coupling rate, it is essential to control this parameter and the pH of the sensitizing formulation must be above pH 5 and no more than pH 12, based on the use of the organic components in an aqueous system. The concentration of the alkaline components is, however, used in a non-aqueous system and the values of pH used in the aqueous system are equally applicable to the preferred organic solvent systems.

The alkaline agent, which is employed as an essential ingredient of the light-sensitive material shown in FIGS. 1 and 3 to accelerate self-development as a result of imagewise exposure of a master to actinic illumination, is substantially non-volatile amine, which is substantially free from objectionable odor and is of low toxicity. Preferably, the amine is a solid at room temperature. An example of an exceptionally efficient amine is N-(2-hydroxyethyl) cyclohexylamine.

The concentration level of N-(2-hydroxyethyl) cyclohexylamine used in the negative-working system may range from 0.1% to 5.0% by weight, depending upon other additives used in the formula. The concentration used is that which will produce the pH required for optimum image density upon exposure. Too high a concentration of amine with consequent high pH does not improve image density above the optimum and causes difficulty in acidification and light-clearing. Equally important to image density is the capability to completely clear the unexposed areas of unreacted diazosulfonate and thus fix the image. N-(2-hydroxyethyl) cyclohexylamine has never been used in any negative-working system and has the following desirable physical properties:

(1) It is a colorless, low melting solid of very low toxicity.

(2) It is practically odorless and has a vapor pressure of less than 1 mm. of mercury at 80° C., has a molecular weight of 143 and a melting point of 36.1 to 38.8° C.

(3) It is inexpensive and available in pure form in any quantity desired from many commercial sources.

Other solid amines which are useful by reason of their strong alkaline reaction (pH 6.2–11.5) are: aminobenzimidazole; tetramethyl quanidine; diphenylethylenediamine; di-orthotolylethylene diamine; 2,4-diamino diaphenylamine; phenyl-alpha-naphthylamine; 2,2,4-trimethyl-1,2-dihydroquinoline; p-p-dimethoxydiphenylamine; diglycolamine ($HOCH_2CH_2OCH_2CH_2NH_2$).

The secondary or tertiary amine may be a substantially non-volatile, low odor liquid, such as: aminoquinalidine; 1,2,4-trimethylpiperazine; phenylethanolamine, dicyclohexylamine; N-butyldiethanolamine.

The foregoing solid and liquid amines contribute to commercial success by improving the efficiency of the image-forming reaction and by improving shelf-life. The present negative-working materials overcome the inherent deficiencies of wet processing to provide a range of dense colors from yellow to cyan (including black), excellent background and shelf-life, high resolution, high printing-density, and ease of manufacture on a wide variety of base supports. These achievements constitute a major advance in the state-of-the-art, opening up possibilities for application in duplication of aerial reconnaissance photographs, color-proofing, and the multitude of applications requiring reversal from negative to positive prints. The diazosulfonates are based upon an aromatic nucleus of the benzene series, naphthalene series, pyrridine series, phenol thiazines, benztriazine series, benzthiomorpholone series, benzothiazole series, carbazole series, benzimidazoline series, benzthiopyrane series, and phenoxazene series with an azo coupling component (e.g., resorcinols, naphthols, acetoacetamides, both alphatic and aromatic types, pyrazalones and the like).

Some of the most valuable compounds produced are based upon new compounds embodying cyclic nuclei which have not heretofore been prepared. These new compounds which can be used in the present invention are not claimed herein but are disclosed as new light-sensitive materials and claimed in a separate application of one of the inventors herein.

The following comprises the general method of preparation of these new compounds.

GENERAL APPLICATION

A 10% aqueous solution of a diazo-zinc chloride salt is prepared, the pH adjusted to 2.1–2.3. (Usually two drops of 36% HCl) and the solution decolorized by treating with Nuchar charcoal and filtering. To this clarified diazo solution is rapidly added with a 50% stoichiometric excess of sodium sulfite in a 10% aqueous solution and a precipitate usually forms, generally before all the sodium sulfite solution has been added. The precipitate redissolves by the time addition is completed, to form a red solution. This solution is stirred well for approximately 30 minutes, the solution is filtered and the diazosulfonate thereafter precipitates.

If the diazosulfonate does not precipitate, the solution is cooled to 5–10° C. Salting out of the diazosulfonate with sodium chloride aids recovery.

The diazosulfonate is then filtered and washed with a 20% aqueous sodium chloride solution. Drying is completed quickly by washing with a few ml. of isopropanol followed by petroleum ether. The following are specific examples:

(1) Naphthalene Diazosulfonate

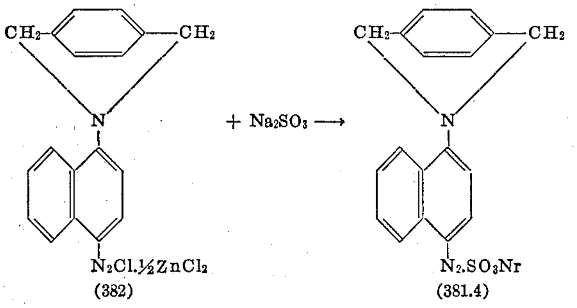

(382) (381.4)

1-[N(3-azabicyclo[3,2,2]nonane)]naphthalene-4-diazonium chloride ½ zinc chloride salt (0.027

| | | |
|---|---|---|
| mol) | gm | 10.5 |
| Water | ml | 400 |
| Sodium sulfite (0.035 mol) | gm | 4.6 |
| Water | ml | 46 |

There is added to 10.5 grams of 1-[N-(3-azabicyclo[3,2,2]nonane)]naphalene-4-diazonium chloride ½ zinc chloride salt an amount of 800 ml. of water to completely dissolve the salt and the diazonium solution is adjusted to pH of 2.2–2.5 with 36% HCl, decolorized with Nuchar, and while stirring, a solution of 4.6 gm. of sodium sulfite in 46 ml. of water is rapidly added. A cloudy red solution formed which is filtered. The clear solution, after filtering, is then treated with a small amount of sodium chloride to salt out the product and cooled slowly with stirring. The yellow precipitate is then filtered and washed with 20 %sodium chloride solution and finally dried over phosphorous pentoxide in a desiccator. 3.0 gm. of 1-[N(3-azabicyclo[3,2,2]nonane)]naphthalene - 4 - diazonium sodium sulfonate was obtained. (Decomposes 238° C.)

(2) Benzothiazole Diazosulfonate

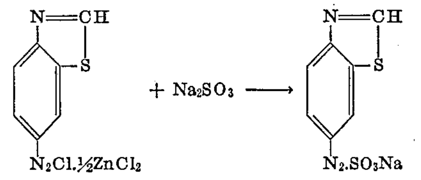

(265.8) (126.1) (265.2)

| | | |
|---|---|---|
| Benzothiazole-6-diazonium chloride ½ zinc chloride salt (0.05 mol) | gm | 13.3 |
| Water | ml | 135 |
| Sodium sulfite (0.07 mol) | gm | 8.8 |
| Water | ml | 10 |

13.3 gm. of benzothiazole-6-diazonium chloride ½ zinc chloride salt is dissolved in 135 ml. water and adjusted to pH 2.2–2.5 with 36% HCl. The diazonium solution is decolorized with Nuchar. To the well-stirred solution there is rapidly added 8.8 gm. of sodium sulfite in 10 ml. of water. A small amount of sodium chloride is added and the solution is cooled slowly with stirring. The precipitate is filtered and washed with a 20% sodium chloride solution followed with a cold isopropanol wash and finally with petroleum ether. The yellow benzothiazole-6-diazonium sodium sulfonate is air dried.

(3) Carbazole Diazosulfonate

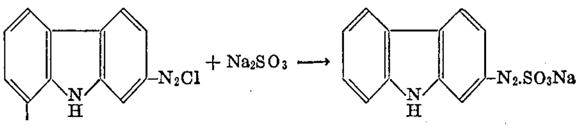

(229.7) (126.1) (297.2)

| | | |
|---|---|---|
| Carbazole-2-diazonium chloride (diazotization reaction mixture) (0.10 mol) | | Theoretically |
| Sodium sulfite (0.12 mol) | gm | 15.1 |
| Water | ml | 150 |

Carbazole-2-diazonium chloride can be isolated as the zinc chloride salt for it decomposed immediately. Therefore, 0.10 mol of 2-aminocarbazole is diazotized in the usual manner and this diazotization reaction mixture is used. The pH is adjusted to 2.2 with solid sodium bicarbonate with cooling and this mixture is then decolorized with Nuchar. To the charified diazonium solution there is rapidly added 15.1 gm. of sodium sulfite in 150 ml. water with good stirring. An orange precipitate formed almost immediately. The mixture is cooled and stirred well, and then filtered to yield 12.0 gm. of yellow carbazole-2-diazonium sodium sulfonate. The diazosulfonate is washed with cold water followed with cold isopropanol and finally petroleum ether and air dried.

(4) Imidazole Diazosulfonate

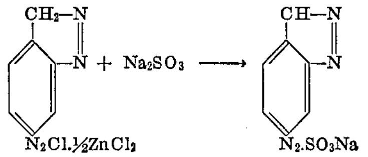

(248.7) (126.1) (248.1)

| | | |
|---|---|---|
| 3H-imidazole-6-diazonium chloride ½ zinc chloride salt (0.05 mol) | gm | 12.4 |
| Water | ml | 125 |
| Sodium sulfite (0.07 mol) | gm | 8.8 |
| Water | ml | 10 |

12.4 gm. of 3H-imidazole-6-diazonium chloride ½ zinc chloride salt is dissolved in 125 ml. water. The pH of this diazonium solution is adjusted to 2.2–2.5 with 36% HCl and decolorized with charcoal. The solution is stirred well and 8.8 gm. of sodium sulfite in 10 ml. of water is added rapidly. To this solution there is added a few grams of sodium chloride and the mixture is cooled slowly with stirring.

The yellow 3H-imidazole-6-diazonium sodium sulfonate is filtered off and washed first with a 20% salt solution, followed with isopropanol, and finally with petroleum ether.

(5) Pyridine Diazosulfonate

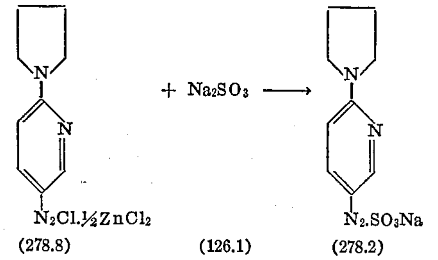

| | | |
|---|---|---|
| 2-pyrrolidino pyridine-5-diazonium chloride ½ zinc chloride salt (0.038 mol) | gm. | 10.6 |
| Water | ml. | 100 |
| Sodium sulfite (0.05 mol) | gm. | 6.3 |
| Water | ml. | 70 |

An amount of 10.6 gm. of 2-pyrrolidino pyridine-5-diazonium chloride dissolved in 100 ml. of water, and pH adjusted to 2.2–2.5 with 36% HCl is decolorized with charcoal to form a clarified diazonium solution. There were added 6.3 gm. of sodium sulfite in 70 ml. of water fairly rapidly with good stirring and a yellow-orange precipitate formed which is filtered after salting the solution with a small amount of sodium chloride and then cooling. In this manner, 7.7 gm. of yellow 2-pyrrolidino pyridine-5-diazonium sodium sulfonate are recovered and this material is washed first with a 20% sodium chloride, then with isopropanol and finally with a small amount of petroleum ether.

(6) Thiomorpholone Diazosulfonate

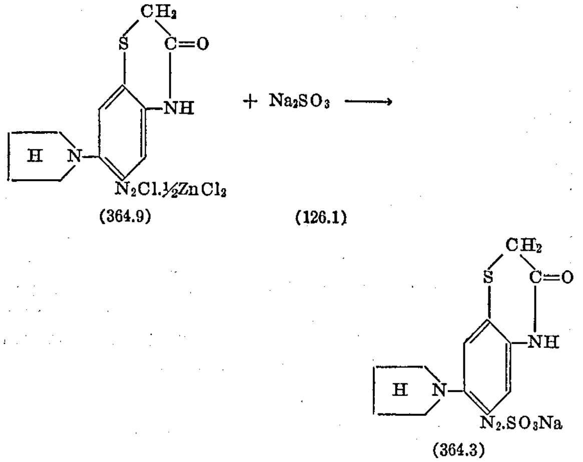

| | | |
|---|---|---|
| 7-pyrrolidino-2H,4H-3-one-1,4 - benzothiazine - 6-diazonium chloride ½ zinc chloride salt (0.05 mol) | gm. | 18.2 |
| Water | ml. | 180 |
| Sodium sulfite (0.07 mol) | gm. | 8.8 |

18.2 gm. of 7-pyrrolidino-2H,4H-3-one-1,4-benzothiazine-6-diazonium chloride ½ zinc salt are dissolved in 180 ml. water, the pH adjusted to 2.2–2.5 and the solution decolorized with charcoal. The clarified solution is stirred with 8.8 gm. sodium sulfite in 10 ml. of water, a few grams of sodium chloride are added to salt out the sulfonate and the solution is slowly cooled while stirring. A precipitate of 7-pyrrolidino-2H,4H-3-one-1,4-benzothiazine-6-diazonium sodium sulfonate formed which is filtered to recover yellow solid. The solid is washed first with 20% sodium chloride solution, then with isopropanol, and finally with petroleum ether and air dried.

(7) Thiopyran Diazosulfonate

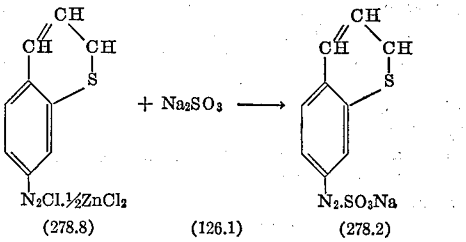

| | | |
|---|---|---|
| 2H-1-benzothiopyran-7-diazonium chloride ½ zinc chloride salt (0.05 mol) | gm. | 13.9 |
| Water | ml. | 140 |
| Sodium sulfite (0.07 mol) | gm. | 8.8 |
| Water | ml. | 10 |

13.9 gm. of 2H-benzothiopyran-7-diazonium chloride ½ zinc chloride salt are dissolved in 140 ml. water, and the pH adjusted to 2.2–2.5 with 36% HCl. The diazonium solution is decolorized with charcoal. This clarified solution is stirred well as 8.8 gm. of sodium sulfite is rapidly added. When a precipitate does not form the solution is salted with a small amount of sodium chloride and cooled slowly. The precipitate is filtered off. The yellow 2H-1-benzothiopyran-7-diazonium sodium sulfonate is washed with 20% sodium chloride solution, then with cold isopropanol, followed with petroleum ether, and air dried.

(8) Oxazine Diazosulfonate

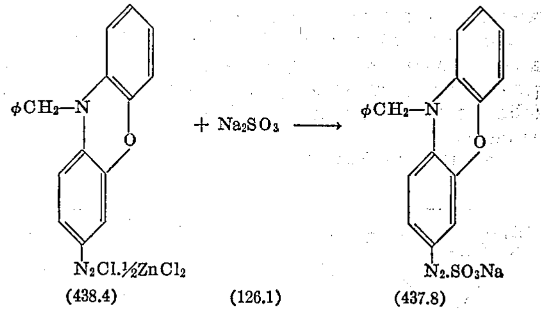

| | | |
|---|---|---|
| N-benzyl phenoxazine-3-diazonium chloride ½ zinc chloride salt (0.023 mol) | gm. | 10.0 |
| Water | ml. | 100 |
| Sodium sulfite (0.033 mol) | gm. | 4.1 |
| Water | ml. | 40 |

10.0 gm. of N-benzyl phenoxazine-3-diazonium chloride ½ zinc chloride salt are dissolved in 100 ml. water. The pH is adjusted to 2.2–2.5 with 36% HCl and the diazonium solution is decolorized with Nuchar. A solution of 4.1 gm. of sodium sulfite in 40 ml. of water is rapidly added with good agitation. A cloudy red solution formed which is filtered off. The solution has to be salted out with a small amount of sodium chloride and cooled before a precipitate can be obtained. The solution is cooled well and 8.0 gm. of red N-benzyl phenoxazine-3-diazonium sodium sulfonate is recovered. The diazosulfonate is washed first with 20% sodium chloride solution, then with cold isopropanol followed by petroleum ether.

(9) Thiazine Diazosulfonate

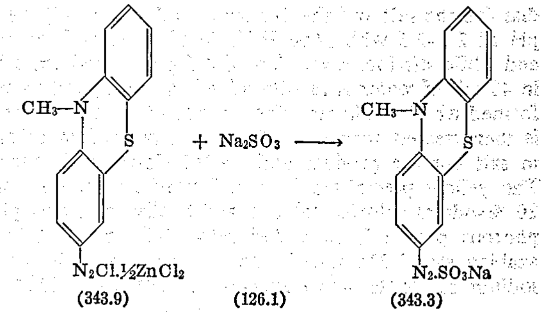

| | | |
|---|---|---|
| N-methyl phenothiazine-3-diazonium chloride ½ zinc chloride salt (0.018 mol) | gm | 6.3 |
| Water | ml | 65 |
| Sodium sulfite (0.03 mol) | gm | 3.7 |
| Water | gm | 35 |

6.3 gm. of N-methylphenothiazine-3-diazonium chloride ½ zinc chloride salt are dissolved in 65 ml. of water. This solution is adjusted to a pH of 2.2–2.5 with 36% HCl and decolorized with charcoal. To the clarified diazonium solution there is rapidly added 3.7 gm. of sodium sulfite in 35 ml. water, and stirred well. A yellow precipitate formed. The mixture is cooled with good agitation. 3.0 gm. of yellow N-methylphenothiazine-3-diazonium sodium sulfonate are filtered off. The solids are washed with cold isopropanol followed by petroleum ether and air dried.

(10) Pyrrole Diazosulfonate

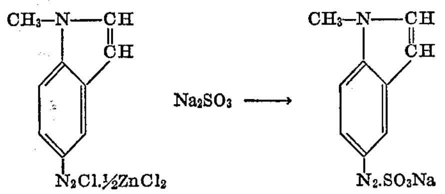

(261.8) (126.1) (261.2)

| | | |
|---|---|---|
| 1-methyl benzopyrrole-5-diazonium chloride ½ zinc chloride salt (0.05 mol) | gm | 13.1 |
| Water | ml | 130 |
| Sodium sulfite (0.07 mol) | gm | 8.8 |
| Water | ml | 10 |

13.1 gm. of 1-methyl benzopyrrole-5-diazonium chloride ½ zinc chloride salt are dissolved in 130 ml. of water. The pH of this diazonium solution is adjusted to 2.2–2.5 with 36% HCl, and clarified with Nuchar. With good stirring, 8.8 gm. of sodium sulfite in 10 ml. of water are rapidly added. When a precipitate did form, a small amount of sodium chloride is added and the mixture is cooled with stirring. The yellow precipitate of 1-methyl benzopyrrole-5-diazonium sodium sulfonate is filtered off and washed, first with a 20% sodium chloride solution, followed with cold isopropanol then petroleum ether, and air dried.

(11) Triazine Diazosulfonate

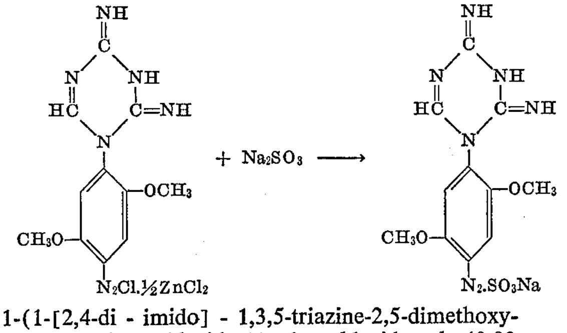

| | | |
|---|---|---|
| 1-(1-[2,4-di - imido] - 1,3,5-triazine-2,5-dimethoxy-4-diazonium chloride ½ zinc chloride salt (0.03 mol) | gm | 11.3 |
| Water | ml | 115 |
| Sodium sulfite (0.05 mol) | gm | 6.3 |
| Water | ml | 65 |

11.3 gm. of 1-(1-[2,4-di-imido]-1,3,5-triazine)-2,5-dimethoxy-4-diazonium chloride ½ zinc chloride salt are dissolved in 115 ml. of water. The pH of this diazonium solution is adjusted to 2.2–2.5 with 36% HCl and the solution is decolorized with Nuchar. This clarified solution is stirred well as 6.3 gm. of sodium sulfite in 65 ml. water are added rapidly. A few grams of sodium chloride are added when a precipitate did not form, and the mixture is cooled slowly. The yellow precipitate of 1-(1-[2,4-di-imido]-1,3,5-triazine)-2,5-dimethoxy - 4 - diazonium sodium sulfonate is filtered and washed with a 20% sodium chloride solution followed by cold isopropanol and finally with petroleum ether.

The following show preferred operating examples:

EXAMPLE I

Aqueous system on saponified cellulose acetate

A sensitizing mixture is prepared from the following:

| | | |
|---|---|---|
| Water | ml | 90 |
| Isopropyl alcohol | ml | 8 |
| n-Butyl alcohol | ml | 2 |
| o-Sulfobenzaldehyde sodium salt | gr | 3.0 |
| N(2-hydroxyethyl)cyclohexylamine | gr | 3.0 |
| Phloroglucinol | gr | 3.0 |
| 4-pyrolidine-3-chlorobenzene diazosulfonate sodium salt | gr | 6.0 |

The sensitizing solution is meniscus coated onto a saponified cellulose acetate support in the dark or in subdued, non-actinic light. The solution is a clear, light, yellow-orange solution which is stable and non-coupling over a 24-hour period if kept in darkness at room temperatures.

The excess solution is removed by means of a wiping bar or rod, and the coated film is dried at 150° F. for approximately five minutes. This uniform coating is very sensitive to actinic light and when exposed under a master or pattern will rapidly form a dense, reddish brown image in the light-struck areas. Fixing is achieved by washing the print in water at 100–120° F. for at least 30 seconds. The resulting negative print will have a good, dense image with a clear background.

EXAMPLE II

Organic solvent system on cellulose acetate

| | | |
|---|---|---|
| Methanol | ml | 52 |
| Acetone | ml | 38 |
| Methyl ethyl ketone | ml | 10 |
| Zinc chloride | gr | 0.75 |
| o-Sulfobenzaldehyde sodium salt | gr | 2.0 |
| N(2-hydroxyethyl)cyclohexylamine | gr | 2.0 |
| β-oxynaphthoic acid o-anisidide | gr | 0.9 |
| 4-(N,N-diethylamine)-3 - chlorobenzene diazosulfonate sodium salt | gr | 1.0 |

The diazosulfonate is added to the solution in the dark or in subdued, non-actinic light. The result is a clear, light, yellow-orange solution which is stable and non-coupling over a 24-hour period, if kept in darkness at room temperature.

The above formula is meniscus coated in subdued non-actinic light onto cellulose acetate and dried at 150° F. for approximately five minutes. This coated film is very sensitive to actinic light and, when exposed under a master or pattern will rapidly form a dense purple image in the light-struck areas. Fixing is achieved by treating the coating to dry acetic acid vapors at about 200° F. and then light-clearing by exposure to strong actinic light, until the diazosulfonate has been entirely decomposed to a colorless compound. The resulting negative print will have a good, dense image and a clear background.

EXAMPLE III

Organic solvent system on polyester base support (Mylar)

| | | |
|---|---|---|
| Methanol | ml | 52 |
| Acetone | ml | 38 |
| Methyl ethyl ketone | ml | 10 |
| o-Sulfobenzaldehyde sodium salt | gr | 2.0 |
| N(2-hydroxyethyl)cyclohexylamine | gr | 2.0 |
| β-(N-ethyl, N-benzylamino)benzene diazosulfonate, sodium salt | gr | 1.0 |
| β-Oxynaphthoic acid o-anisidide | gr | 0.9 |

The diazosulfonate is added to the solution in the dark or in subdued non-actinic light. The result is a clear, light, yellow-orange solution which is stable and non-coupling over a 24 hour period if kept in darkness and at room temperature.

The above formula is meniscus coated in subdued non-actinic light onto a suitable lacquer-coated polyester base and dried at 150° F. for approximately five minutes. This coated film is very sensitive to actinic light and, when exposed under a master or pattern will rapidly form a dense dark blue image in the light-struck areas.

Fixing is achieved by first treating the coating with acetic acid vapors at about 200° F. and then light-clearing by exposing to strong actinic light until the diazosulfonate has been entirely decomposed to a colorless compound. This procedure will yield a dark blue negative-image print with a clear background.

EXAMPLE IV

Aqueous system on saponified cellulose acetate

| | | |
|---|---|---|
| Water | ml | 90 |
| Isopropyl alcohol | ml | 8 |
| n-Butyl alcohol | ml | 2 |
| o-Sulfobenzaldehyde sodium salt | gr | 2.0 |
| Phloroglucinol | gr | 3.0 |
| 4-pyrolidiono-3-chlorobenzene-diazosulfonate sodium salt | gr | 6.0 |

The diazosulfonate is added in the dark or in subdued non-actinic light. The result is a clear, light yellow-orange solution which is stable for a lesser period than that formula containing cyclohexylamine derivatives, if kept in darkness at room temperature.

This formula is meniscus coated in subdued non-actinic light onto deeply saponified cellulose acetate. The excess solution is removed by means of a wiping rod or bar and the coated film is dried at 150° F. for approximately 5 minutes. This uniform coating is very sensitive to actinic light and when subjected to a saturated ammonia atmosphere and then exposed to actinic light under a master or pattern, it will form a dense reddish brown image in the light-struck areas. Fixing is achieved by washing the print in water at 100–120° F. for at least 30 seconds. The result will be a good, dense image with a clear background.

EXAMPLE V

Organic solvent system on cellulose acetate

| | | |
|---|---|---|
| Methanol | ml | 52 |
| Acetone | ml | 38 |
| Methyl ethyl ketone | ml | 10 |
| Zinc chloride | gr | 0.5 |
| o-Sulfobenzaldehyde sodium salt | gr | 2.0 |
| β-Oxynaphthoic acid-o-anisidide | gr | 0.9 |
| 4-(N,N-diethylamino)3-chlorobenzene-diazosulfonate sodium salt | gr | 1.0 |

The diazosulfonate is added to the solution in the dark or in subdued non-actinic light. The result is a clear, light, yellow-orange solution which is stable for a lesser period than that formula containing the cyclohexylamine derivative if kept in darkness at ambient temperature.

This formula is meniscus coated in subdued non-actinic light onto cellulose acetate and dried at 150° F. for 5 minutes. This coating is very sensitive to actinic light and when subjected to saturated ammonia atmosphere and then exposed to actinic light under a master or pattern, it will form a dense, blue image in the light-struck areas.

Fixing is achieved by first treating the coating with acetic acid vapors at about 200° F. and then light-clearing by exposing the print to strong actinic light until the diazosulfonate has been entirely decomposed to a colorless compound. The resulting negative print will have a good, dense image and a clear background.

EXAMPLE VI

Organic solvent system on polyester base support

| | | |
|---|---|---|
| Methanol | ml | 52 |
| Acetone | ml | 38 |
| Methyl ethyl ketone | ml | 10 |
| Zinc chloride | gr | 0.5 |
| o-Sulfobenzaldehyde sodium salt | gr | 2.0 |
| β-Oxynaphthoic acid-o-anisidide | gr | 0.9 |
| 4-(N,N-diethylamino)3-chlorobenzene diazosulfonate sodium salt | gr | 1.0 |

The diazosulfonate is added to the solution in the dark or in subdued non-actinic light. The result is a clear, light, yellow-orange solution which is stable for a lesser period than that formula containing the cyclohexylamine derivative if kept in darkness at ambient temperature.

This formula is meniscus coated in subdued non-actinic light onto suitable lacquer-coated polyester base and dried at 150° F. for 5 minutes. This coating is very sensitive to actinic light and when subjected to saturated ammonia atmosphere and then exposed to actinic light under a master or pattern, it will form a dense, blue image in the light-struck areas.

Fixing is achieved by first treating the coating with acetic acid vapors at about 200° F. and then light-clearing by exposing the print to strong actinic light until the diazosulfonate has been entirely decomposed to a colorless compound. The resulting negative print will have a good, dense image and a clear background.

EXAMPLE VII

Aqueous system on paper

This example illustrates the use of paper as a support for the negative-working system:

| | | |
|---|---|---|
| Water | ml | 90 |
| Isopropanol | ml | 8 |
| Isobutanol | ml | 2 |
| o-Sulfobenzaldehyde sodium salt | gr | 4 |
| N-(2-hydroxyethyl)cyclohexylamine | gr | 1 |
| 2,3-dihydroxy-6-sulfonaphthalene | gr | 3.0 |
| 4-(N-ethyl, N-benzylamino)-benzene diazosulfonate sodium salt | gr | 3.0 |

This formula, when coated in a discrete layer (3–30 microns) on the surface of a properly prepared paper support, will produce a dense reddish-blue image. The coating can then be acidified and light-cleaned to produce a clean background.

The paper support is prepared for coating by first treating the surface with a polyvinyl acetate sealer and then following with a silicon dioxide pigment precoat with polyvinyl acetate binder. This layer is sensitized with the above negative-working formula.

EXAMPLE VIII

Potassium acetate alkaline agent in solvent system

The following example illustrates the use of a salt of a strong base and a weak organic acid as an alkaline agent to adjust pH to the optimum coupling environment for our negative-working system.

| | | |
|---|---|---|
| Methanol | ml | 52 |
| Acetone | ml | 38 |
| Methyl ethyl ketone | ml | 10 |
| Potassium acetate | gr | 1.75 |
| 4-(N-ethyl, N-benzylamino) benzene diazosulfonate | gr | 1.7 |
| o-Sulfobenzaldehyde sodium salt | gr | 4.0 |
| 3-hydroxy-N-1-naphthyl naphthamide | gr | 1.05 |

This formula exhibits a pH 8.95 in the solvent system and is coated onto cellulose acetate in 10 micron thickness. When exposed to actinic light under a master or pattern it produces a dense, dark blue image in the light-struck areas. The non light-struck areas are cleared by acidification and re-exposure to actinic light as in Example VII.

EXAMPLE IX

Potassium citrate alkaline agent in solvent system

The following example illustrates the use of a salt of a strong base and a weak organic acid as an alkaline agent to adjust pH to the optimum coupling environment for our negative-working system.

| | | |
|---|---|---|
| Methanol | ml | 52 |
| Acetone | ml | 38 |
| Methyl ethyl ketone | ml | 10 |
| Potassium citrate | gr | 1 |
| 4-(N-ethyl, N-benzylamino) benzene diazosulfonate | gr | 1.7 |
| o-Sulfobenzaldehyde sodium salt | gr | 4.0 |
| 3-hydroxy-N-1-naphthyl naphthamide | gr | 1.05 |

This formula is coated onto cellulose acetate. When exposed to actinic light under a master there is produced a dense, dark blue image in the light-struck areas. The non light-struck areas are cleared by acidification and re-exposure to actinic light in the manner shown in Example VII.

EXAMPLE X

Primary glycol amine alkaline agent in solvent system

The following example illustrates the use of a liquid glycol primary amine as the alkaline agent to adjust pH to the optimum coupling environment for our negative-working system.

| | | |
|---|---|---|
| Methanol | ml | 52 |
| Acetone | ml | 38 |
| Methyl ethyl ketone | ml | 10 |
| o-Sulfobenzaldehyde sodium salt | gr | 4.0 |
| Diethylglycol mono amine | gr | 2 |
| β-oxynaphthoic acid o-anisidide | gr | 0.9 |
| 4-(N-ethyl, N-benzylamino) benzene diazosulfonate sodium salt | gr | 1.7 |

This formula at pH 9.0 is coated onto a cellulose acetate support. It is very sensitive to actinic light and when exposed forms dense blue images in the light-struck areas. The non-light-struck areas are cleared by acidification and exposure to actinic light in the manner shown in Example VII.

EXAMPLE XI

Preammoniation (dry) to control coupling

The following examples illustrate the alternate techniques of using a saturated ammonia atmosphere, in place of N-(2-hydroxyethyl) cyclohexylamine to furnish the optimum coupling pH environment for our negative-working system. Two formulae are given; one, an aqueous system, for paper, cloth, saponified acetate and like supports, and two, a solvent system for the various thermoplastic supports such as cellulose acetate and the like, which cannot be sensitized from aqueous systems.

(1) Aqueous system:

| | | |
|---|---|---|
| Water | ml | 90 |
| Isopronpanol | ml | 8 |
| Isobutanol | ml | 2 |
| 2,3-dihydroxy-6-sulfonaphthalene | gr | 3.0 |
| 4-(N-ethyl, N-benzylamino) benzene diazosulfonate sodium salt | gr | 3.0 |
| o-Sulfobenzaldehyde sodium salt | gr | 4.0 |

This formula is coated on a support paper and onto a cloth support which has been prepared for coating by first treating the surface with a sealer and then following with a pigment precoat with binder, as in Example VII. Surface-saponified (7.5 microns) cellulose acetate is also sensitized directly. Exposure and light-clearing follow the procedure of Example VII.

(2) Solvent system:

| | | |
|---|---|---|
| Methanol | ml | 52 |
| Acetone | ml | 38 |
| Methyl ethyl ketone | ml | 10 |
| o-Sulfobenzaldehyde sodium salt | gr | 4.0 |
| β-oxynaphthoic acid o-anisidide | gr | 0.9 |
| 4-(N-ethyl, N-benzylamino) benzene diazosulfonate sodium salt | gr | 1.7 |

This formula is coated directly onto cellulose acetate and like supports. Exposure and light-clearing follow the procedure of Example VII.

The above formulae, when coated onto their respective supports, are very sensitive to actinic light and when subjected to a saturated ammonia atmosphere and then exposed to actinic light under a master or pattern, form dense images in the light-struck areas. The non light-struck areas are cleared by acidification and re-exposure to actinic light in the manner shown in Example VII.

The foregoing Examples I–XI point out that the application of the light-sensitive coated layer may be achieved by two means:

(1) By imbibing into the support; and (2) By laying down a coating which contains the light-sensitive formulation and a compatible binder.

In general, the light-sensitive formulation (1) above may be imbibed either into a film or paper support. In the case of the film, the formulation remains essentially dissolved once it is imbibed into the support. In the case of paper, the light-sensitive components are colloidally extended onto the surface of the paper support. For colloidal extension, as on paper, the surface must be properly prepared by sealing the paper through special treatment and then precoating to provide a suitable media in a discrete layer about which the light-sensitive formula can be extended.

In contrast, a layered coating (2) above consists of the light-sensitive formulation and a binder in a solvent vehicle. This mixture is coated onto a support to form a separate and discrete layer bonded to the support. On removal of the solvents, by drying, the light-sensitive formula components remain essentially dissolved in the binder. Example XII which follows illustrates a layered coating.

EXAMPLE XII

This formula illustrates a layered coating on cellulose diacetate:

| | | |
|---|---|---|
| Methanol | ml | 52 |
| Acetone | ml | 38 |
| Methyl ethyl ketone | ml | 10 |
| o-Sulfobenzaldehyde sodium salt | gr | 4.0 |
| β-oxynaphthoic acid o-anisidide | gr | 0.9 |
| 4 - (N - ethyl, N - benzylamino) benzene diazosulfonate sodium salt | gr | 1.7 |
| Cellulose diacetate | gr | 3 |

This formula is coated directly onto suitable subbed polyester, e.g. on acrylic resin subbed polyethylene terephthalate. Exposure, development and light-clearing are carried out by the method of Example VII.

As illustrated in the foregoing examples, the diazosulfonate sensitizing solution may be utilized with any support as long as a discrete continuous layer, from about 3–30 microns in thickness, is provided at the surface of the support. The main commercial applications can be carried out with supports such as are used in technical printing, the graphic arts, microfilm, projectuals and in office systems, e.g. paper, plastic, cloth, metal, glass, ceramic (fused alumina and procelain), natural polymer materials and the like.

A commonly used base in technical printing is 100% rag, translucent paper which is treated with a resin transparentizer to increase its light-transmission. Higher quality of reproduction can be achieved by applying a plastic layer to the surface of the rag paper to receive the sensitization. Plastic-coated supports are more durable because of their resistance to soilage and because the sensitizing chemicals do not penetrate the paper fibers, being limited to the plastic layer.

Diazo sensitizations are made on plastic-surfaced drafting cloth and on polyester films. Cellulose-acetate films are frequently used as intermediates for long-run production of forms and reports, because their transparency produces faster printing speeds.

Convenient classifications for the polymers and natural resins are as follows:

(I) NATURAL POLYMERS (A) Cellulose
(B) Derivatives of cellulose:
  (1) Cellulose esters:
    Triacetate, diacetate, acetate butyrate, acetate propionate
    Cellulose nitrate can be sensitized but is hazardous
  (2) Regenerated cellulose, e.g., rayon
  (3) Cellulose ethers:
    Ethyl cellulose
    Carboxymethyl cellulose
    Methyl cellulose (in aqueous system)
    Hydroxypropyl methyl cellulose
  (4) Saponified cellulose esters
  (5) Amino type resins:
    Gelatin (in aqueous system)
    Zein (II) SYNTHETIC POLYMERS (A) Vinyl polymers:
  (1) Polystyrene
  (2) Polystyrene copolymers:
    Acrylonitrile (Lustran)
    Butadiene
    Styrene acrylates
  (3) Vinyl pyrrolidone
  (4) Methacrylic and acrylic esters and polymers:
    Methyl acrylates
    Methyl methacrylates
    Copolymers and terpolymers of the methyl acrylates and methyl methacrylates
  (5) Polyvinyl acetates
  (6) Polyvinyl alcohols
  (7) Polyvinyl butyral
  (8) Polyvinyl chlorides
  (9) Polyvinyl chloride copolymers: Polyvinyl chloride polyvinyl acetate
  (10) Polyvinylidene chloride copolymer: Polyvinylidene chloride acrylonitriles
  (11) Vinyl toluenes: Butadiene copolymers
  (12) Vinyl toluene/acrylate Various additives of the solubilizing type, e.g. glycerine, glycols, etc., may be incorporated with the sensitizing formula to perform a wide variety of functions including alteration of hue, increased density, improvement of shelf life and the like.

We claim:

1. A negative-working self-developing print-out process for producing a high-resolution azo dye image comprising the steps of:

(1) sensitizing a surface of a support, said surface comprising a polymeric material, with a mixture of a para-amino benzene diazosulfonate and coupling component in the presence of an alkaline agent, said alkaline agent being a substantially non-volatile organic amine, to form a continuous discrete layer from 3–30 microns in thickness, said alkaline agent creating an environment of pH of about 6.2–11.5 in which the diazosulfonate exhibits a coupling rate substantially greater than its decomposition rate under exposure to actinic light;

(2) exposing the sensitized surface under imagewise actinic illumination to convert said diazosulfonate to an active diazonium compound which couples to provide an azo dye in the exposed areas as a print-out image;

(3) acidifying the imaged coating to a pH below 4.7; and (4) light clearing the sensitized surface by exposing to overall actinic illumination to clear away the background and to produce colorless products of decomposition outside the azo dye image areas.

2. A negative-working process as claimed in claim 1, wherein said diazosulfonate is 4-(N-ethyl N-benzylamino) benzene diazosulfonate.

3. A negative-working process as claimed in claim 1 wherein said alkaline agent is N-(2-hydroxyethyl) cyclohexylamine.

4. A process as claimed in claim 2 wherein said print-out exposure step is carried out with actinic radiation in the range between 4200–4600 A. and said light-clearing step is carried out with actinic radiation in the range between 3400–4600 A.

5. A process as claimed in claim 2 wherein said print-out exposure step is carried out with monochromatic radiation about 4350 A. and said light-clearing step is carried out with radiation at 4350 A. and 3600 A.

6. A negative-working process as claimed in claim 1, wherein the layer is deposited onto said support from a volatile solvent dispersion and said solvent is water.

7. A negative-working process as claimed in claim 6, wherein the volatile solvent is selected from the class consisting of aliphatic alcohol, aliphatic ketone, aliphatic hydrocarbons, aromatic hydrocarbons and mixtures of the foregoing.

8. A negative-working process as claimed in claim 1 wherein cyan, magenta and yellow color separation prints are each made directly from silver halide color separation masters, and each of the steps of exposing, acidifying and light-clearing for each master is carried out in the dry state and wherein the same diazosulfonate is utilized as the sole diazo component in each of said cyan, magenta and yellow color separation negatives while a different coupler is used for the cyan, magenta and yellow negatives.

9. A negative-working process as claimed in claim 8, wherein said diazosulfonate is 4-(N-ethyl N-benzylamino) benzene diazosulfonate.

10. A negative-working process as claimed in claim 9, wherein the coupling component for the cyan negative is 3-hydroxy N-1-naphthyl naphthamide.

11. A negative-working process as claimed in claim 9, wherein the coupling component for the magenta negative is 1,3-diphenyl-5-pyrazalone.

12. A negative-working process as claimed in claim 9, wherein the coupling component for the yellow negative is acetoacetbenzylamide.

13. A dry-processing negative-working light-clearing diazo photo-reproduction material comprising, upon a surface of a support, said surface comprising a polymeric material, a coating of a para-amino benzene diazosulfonate, a coupler therefor and a non-volatile amine, said amine providing an environment of low toxicity and pH of about 6.2–11.5 said coating being confined to a discrete layer of thickness of 3–30 microns on the surface of said support.

14. A sensitized coated support as claimed in claim 13, wherein said polymeric material is a thermoplastic vehicle.

15. A sensitized coated support as claimed in claim 13, wherein said support is regenerated cellulose.

16. A sensitized coated support as claimed in claim 13, wherein said support is cellulose acetate.

17. A sensitized coated support as claimed in claim 13, wherein said support is polyethylene terephthalate.

18. A sensitized coated support as claimed in claim 13, wherein said support is polystyrene.

19. A sensitized coated support as claimed in claim 13, wherein said support is saponified cellulose acetate.

20. A sensitized coated support as claimed in claim 13, wherein said support is glass.

21. A sensitized coated support as claimed in claim 13 wherein said support is paper.

22. A sensitized coated support as claimed in claim 13 wherein said support is cloth.

23. A sensitized coated support as claimed in claim 13 wherein said support is metal.

24. A sensitized coated support as claimed in claim 13 wherein said diazosulfonate is 4-(N-ethyl N-benzylamino) benzene diazosulfonate.

25. A sensitized coated support as claimed in claim 13 wherein said coupler is 3-hydroxy N-1-naphthyl naphthamide.

26. A sensitized coated support as claimed in claim 13 wherein said coupler is 1,3-diphenyl 5-pyrazalone.

27. A sensitized coated support as claimed in claim 13 wherein said coupler is acetoacetbenzylamide.

References Cited

UNITED STATES PATENTS

| | | | |
|---|---|---|---|
| 1,926,322 | 9/1933 | Vander Grinten et al. | 96—91 XR |
| 1,934,011 | 11/1933 | Schmidt et al. | 96—91 |
| 1,997,507 | 4/1935 | Akintievsky | 96—49 |
| 2,500,099 | 3/1950 | Straley | 96—91 |
| 2,529,029 | 11/1950 | Lantz et al. | 96—91 |
| 2,541,886 | 2/1951 | Neumann | 96—49 |
| 2,613,149 | 10/1952 | Unkauf | 96—91 |
| 2,741,558 | 4/1956 | Sanders et al. | 96—49 |
| 2,789,904 | 4/1957 | Benbrook et al. | 96—91 XR |
| 2,854,338 | 9/1958 | Herrick et al. | 96—49 XR |
| 2,893,866 | 7/1959 | Haefeli | 96—91 XR |
| 2,980,534 | 4/1961 | Printy et al. | 96—91 XR |
| 3,076,707 | 2/1963 | Lawton et al. | 96—49 XR |
| 3,103,436 | 9/1963 | Fago | 96—49 XR |
| 3,153,592 | 10/1964 | Klimkowski et al. | 96—49 |
| 3,309,200 | 3/1967 | Berman et al. | 96—91 XR |
| 3,312,551 | 4/1967 | Sus | 96—49 XR |

FOREIGN PATENTS

| | | |
|---|---|---|
| 865,680 | 4/1961 | Great Britain. |

OTHER REFERENCES

Landau R., "The Diazotype Process," Chemistry and Industry, No. 13, Mar. 31, 1962, pp. 572–576.

Landau R. et al., "Diazo Compounds in the Photocopying Industry," The Journal of Photographic Science, vol. 13, May 1965, paper presented Oct. 31, 1964.

NORMAN G. TORCHIN, Primary Examiner

C. BOWERS, Assistant Examiner

U.S. Cl. X.R.

96—75, 85, 87, 91

PO-1050
(5/69)

UNITED STATES PATENT OFFICE
CERTIFICATE OF CORRECTION

Patent No. 3,479,183 Dated November 18, 1969

Inventor(s) David F. HABIB, Robert S. ALLARD, Eugene J. ZABIK

It is certified that error appears in the above-identified patent and that said Letters Patent are hereby corrected as shown below:

Page 1, before line 1, insert --The invention herein described was made under a contract with the United States Air Force.--

SIGNED AND SEALED
JUN 30 1970

(SEAL)
Attest:

Edward M. Fletcher, Jr.
Attesting Officer

WILLIAM E. SCHUYLER, JR.
Commissioner of Patents